US012496251B2

(12) United States Patent
Chen et al.

(10) Patent No.: US 12,496,251 B2
(45) Date of Patent: Dec. 16, 2025

(54) HAND-HELD LOW-NOISE SHOCK-ABSORBING ELECTRIC MASSAGER

(71) Applicant: Guangdong Lemark Electronics Technology Co., LTD., Zhaoqing (CN)

(72) Inventors: Shengxiong Chen, Zhaoqing (CN); Jianguang He, Zhaoqing (CN); Zhimin Mai, Zhaoqing (CN)

(73) Assignee: GUANGDONG LEMARK ELECTRONICS TECHNOLOGY CO., LTD., Guangdong (CN)

( * ) Notice: Subject to any disclaimer, the term of this patent is extended or adjusted under 35 U.S.C. 154(b) by 929 days.

(21) Appl. No.: 17/712,082

(22) Filed: Apr. 2, 2022

(65) Prior Publication Data

US 2022/0339061 A1 Oct. 27, 2022

(30) Foreign Application Priority Data

Apr. 22, 2021 (CN) ......................... 202110434026.7

(51) Int. Cl.
*A61H 23/00* (2006.01)
*A61H 23/02* (2006.01)

(52) U.S. Cl.
CPC ........... *A61H 23/006* (2013.01); *A61H 23/02* (2013.01); *A61H 2201/0107* (2013.01);
(Continued)

(58) Field of Classification Search
CPC .......... A61H 23/006; A61H 2201/0173; A61H 2201/0169; A61H 2201/1654
See application file for complete search history.

(56) References Cited

U.S. PATENT DOCUMENTS 11,723,830 B1 * 8/2023 Marton ................ A61H 23/006 601/108
2010/0234771 A1 * 9/2010 Ingrassia ................ A61H 37/00 601/1
(Continued)

FOREIGN PATENT DOCUMENTS

CN 211623560 U * 10/2020
CN 112790570 A * 5/2021 ............ A61M 21/00
(Continued)

OTHER PUBLICATIONS

KR_102078829_B1 translation (Year: 2025).*
(Continued)

*Primary Examiner* — Kendra D Carter
*Assistant Examiner* — Graciela Natalia Lebron De Jesus
(74) *Attorney, Agent, or Firm* — Ming Jiang; OPENPTO US LLC

(57) ABSTRACT

A hand-held low-noise shock-absorbing electric massager includes a lower shell, an upper shell, and a moving shaft rod. A right end of the moving shaft rod is provided with a massage head. The hand-held low-noise shock-absorbing electric massager further includes a transmission module bracket. An outer side wall of the moving shaft rod is coaxially provided with a shaft sleeve lubricating member. The driving part is arranged at a left end of the transmission module bracket. Two sides of the transmission module bracket are each provided with a first shock-absorbing member. The moving shaft rod is installed on the shell through the transmission module bracket. The transmission module bracket is integrated, which can ensure consistency and stability of the moving shaft rod in high-speed linear motion, that is, vibration between the moving shaft rod and the transmission module bracket is reduced during motion, and noise is also reduced.

8 Claims, 4 Drawing Sheets

(52) U.S. Cl.
CPC ................ *A61H 2201/0153* (2013.01); *A61H 2201/0169* (2013.01); *A61H 2201/018* (2013.01); *A61H 2201/123* (2013.01); *A61H 2201/1654* (2013.01); *A61H 2201/1664* (2013.01); *A61H 2201/5025* (2013.01)

(56) References Cited

U.S. PATENT DOCUMENTS

| | | | | |
|---|---|---|---|---|
| 2015/0315509 | A1* | 11/2015 | Watanabe | C10M 129/26<br>508/525 |
| 2022/0096319 | A1* | 3/2022 | Yi | A61H 23/0263 |
| 2022/0151865 | A1* | 5/2022 | Hu | A61H 23/02 |
| 2022/0331199 | A1* | 10/2022 | Zang | A61H 23/006 |

FOREIGN PATENT DOCUMENTS

| | | | | |
|---|---|---|---|---|
| CN | 215021984 | U * | 12/2021 | |
| EP | 3936105 | A1 * | 1/2022 | A61H 23/02 |
| KR | 102078829 | B1 * | 2/2020 | A61H 23/0254 |

OTHER PUBLICATIONS

CN_215021984_U (Year: 2025).*
CN_112790570_A Translation (Year: 2025).*
CN_211623560_U Translation (Year: 2025).*

* cited by examiner

HAND-HELD LOW-NOISE SHOCK-ABSORBING ELECTRIC MASSAGER

CROSS REFERENCE TO THE RELATED APPLICATIONS

This application is based upon and claims priority to Chinese Patent Application No. 202110434026.7, filed on Apr. 22, 2021, the entire contents of which are incorporated herein by reference.

TECHNICAL FIELD

The present disclosure relates to the field of massagers, and in particular, to a hand-held low-noise shock-absorbing electric massager.

BACKGROUND

As a new generation of health care equipment developed according to physics, bionics, bioelectricity, Chinese medicine, and many years of clinical practice, the massager has various functions such as relaxing the body, effectively reducing muscular soreness, and promoting blood circulation. However, the existing massagers have the following defects: 1. a moving shaft rod is integrally installed and matched with a shell, and resonates during linear reciprocating motions, resulting in noise. 2. The shell for a user to hold also generates abnormal noise due to the vibration of the moving shaft rod, and at the same time, the user can also feel strong vibration when holding the shell, resulting in poor use experience. 3. There are electronic components in a massage head used for massage contact with the user, including electronic components for heating and vibration. The electronic components also generate noise during operation, and the noise is conducted in direct contact with the user, which lacks comfort.

SUMMARY

An objective of the present disclosure is to provide a hand-held low-noise shock-absorbing electric massager, which has noise reduction effect and comfort, is beneficial to reduce noise generated by the massager during operation, and improves the user's comfort.

In order to achieve the aforementioned objective, the technical solution of the present disclosure is as follows.

A hand-held low-noise shock-absorbing electric massager includes a lower shell, an upper shell, and a moving shaft rod. A right end of the moving shaft rod is provided with a massage head, and a left end is provided with a driving part controlling the moving shaft rod to perform linear reciprocating motion. The hand-held low-noise shock-absorbing electric massager further includes a transmission module bracket. An outer side wall of the moving shaft rod is coaxially provided with a shaft sleeve lubricating member. An inner side wall of the shaft sleeve lubricating member is in sliding fit with the outer side wall of the moving shaft rod. A right end of the transmission module bracket is provided with a shaft sleeve fixing cover. The shaft sleeve fixing cover and the right end of the transmission module bracket form a cavity for installation of the shaft sleeve lubricating member. The driving part is arranged at a left end of the transmission module bracket. Two sides of the transmission module bracket are each provided with a first shock-absorbing member. An axis of the first shock-absorbing member and an axis of the moving shaft rod are perpendicular to each other. One end of the first shock-absorbing member abuts against an inner side wall of the lower shell, and the other end abuts against an inner side wall of the upper shell. A sound reflection plate is arranged on the inner side walls of the lower shell and the upper shell, respectively. A shock-absorbing pad covers an outer surface of the massage head.

Preferably, an outer side wall of the shaft sleeve lubricating member may be coaxially provided with a second shock-absorbing member, and the inner side wall of the shaft sleeve lubricating member may be provided with an annular groove, and the annular groove may be provided with a filler.

Preferably, the second shock-absorbing member may be a silica gel ring, the shaft sleeve lubricating member may be a special wear-resistant alloy copper sleeve, and the filler in the annular groove may be lubricating grease: one from the group consisting of lithium-based grease, calcium-based grease, aluminum-based grease, complex lithium-based grease, and complex aluminum-based grease.

Preferably, the first shock-absorbing member may be a silica gel column. At least three silica gel columns may be arranged on one side of the transmission module bracket. A socket for installation of each of the silica gel columns may be formed in the transmission module bracket. Each of the silica gel columns may penetrate the socket, and a top end of each of the silica gel columns may abut against the inner side wall of the lower shell, and a bottom end of each of the silica gel columns abut against the inner side wall of the upper shell.

Preferably, the transmission module bracket may be made of an aluminum material.

Preferably, the shock-absorbing pad may include a sound-absorbing cloth cover, a sound-insulation layer, and a nano coating arranged from bottom to top. Two sides of the sound-insulation layer may be respectively connected with the sound-absorbing cloth cover and the nanocoating by pasting. The sound-insulation layer may further be provided with a plurality of filling cavities. A sound-insulation medium may be arranged in each of the filling cavities.

Preferably, the sound-absorbing cloth cover may have a thickness of 0.02-0.1 cm. The sound-insulation layer may have a thickness of 0.2-0.3 cm. The sound-insulation medium may be aluminum powder. The nano coating may be a nano magnetic coating made of nano nickel powder. The nano magnetic coating may have a thickness of 0.1-0.2 cm.

Preferably, the driving part may include a lithium battery arranged on the inner side wall of the upper shell, a circuit board arranged on the inner side wall of the lower shell, a motor arranged on the transmission module bracket, and a swing rod for transmission. A rotating shaft of the motor may be in transmission connection with an eccentric piece. One end of the swing rod may be connected with the eccentric piece and the other end may be connected with the left end of the moving shaft rod. A switch may be arranged on the circuit board. A button matched with the switch may be arranged on the lower shell. The motor may be electrically connected with the lithium battery through the circuit board.

Preferably, a skeleton for installation of the right end of the transmission module bracket may be arranged on the inner side walls of the upper shell and the lower shell. The sound reflection plate may be arranged on two sides of the skeleton, respectively. The sound reflection plate may have a V-shaped cross section with an included angle of 110°-115°. The included angle may face a surface of the transmission module bracket. A sound-absorbing cloth cover may cover the surface of the transmission module bracket. two sides of the sound reflection plate may be fixed with the lower shell and the upper shell by screws. Edges of the lower shell and the upper shell may be fixed by screws after being buckled. Bottoms of outer side surfaces of the lower shell and the upper shell may both be provided with an anti-skid shock-absorbing rubber strip.

Beneficial effects of the present disclosure are as follows: the moving shaft rod is installed on the shell through the transmission module bracket. Design of the transmission module bracket is integrated, which can ensure consistency and stability of the moving shaft rod in high-speed linear motion, and the shaft sleeve lubricating member arranged on the outer side wall of the moving shaft rod plays a guiding role and reduces the resistance during motion of the moving shaft rod, that is, vibration generated between the moving shaft rod and the transmission module bracket is reduced during motion, and noise is also reduced. In addition, the noise generated during operation is reflected to the sound-absorbing cloth cover of the transmission module bracket through the sound reflection plate arranged at a matching position of the body of the moving shaft rod and the right end of the transmission module bracket, so as to further improve the noise reduction effect. The first shock-absorbing member of the transmission module bracket arranged between the lower shell and the upper shell acts on the inner side walls of the lower shell and the upper shell at the same time, that is, the vibration generated between the transmission module bracket and the shells is reduced during contact, so as to prevent the shells from generating abnormal noise from vibration of the moving shaft rod. The shock-absorbing pad arranged on the massage head is in direct contact with the massage area of the user, which reduces the noise generated by the electronic components during operation when the massage head is in contact with the user, and improves the use comfort when in contact with the massage head. The present disclosure mainly reduces the vibration and jiggling frequency of the workpiece which is the source of the noise and reflects and absorbs the noise, thereby reducing the noise transmitted from the inner cavity of the shell to the outside world. The combination of the two methods makes the sound generated by the present disclosure during operation in the range of 20-30 decibels, and both the use comfort and the noise reduction effect are improved compared with those of the existing massagers that just meet the noise index (below 60 decibels). The unique modular design of transmission can ensure that the massager works with low noise and high stability even after long time use.

Additional aspects and advantages of the present disclosure will be partly provided in the following description, and partly become evident in the following description or are understood through the practice of the present disclosure.

BRIEF DESCRIPTION OF THE DRAWINGS

To describe the technical solutions in the embodiments of the present disclosure or in the prior art more clearly, the accompanying drawings required for describing the embodiments or the prior art will be described briefly below. Apparently, the accompanying drawings in the following description show some embodiments of the present disclosure, and those of ordinary skill in the art may still derive other drawings from these accompanying drawings without creative efforts.

Figure 1:
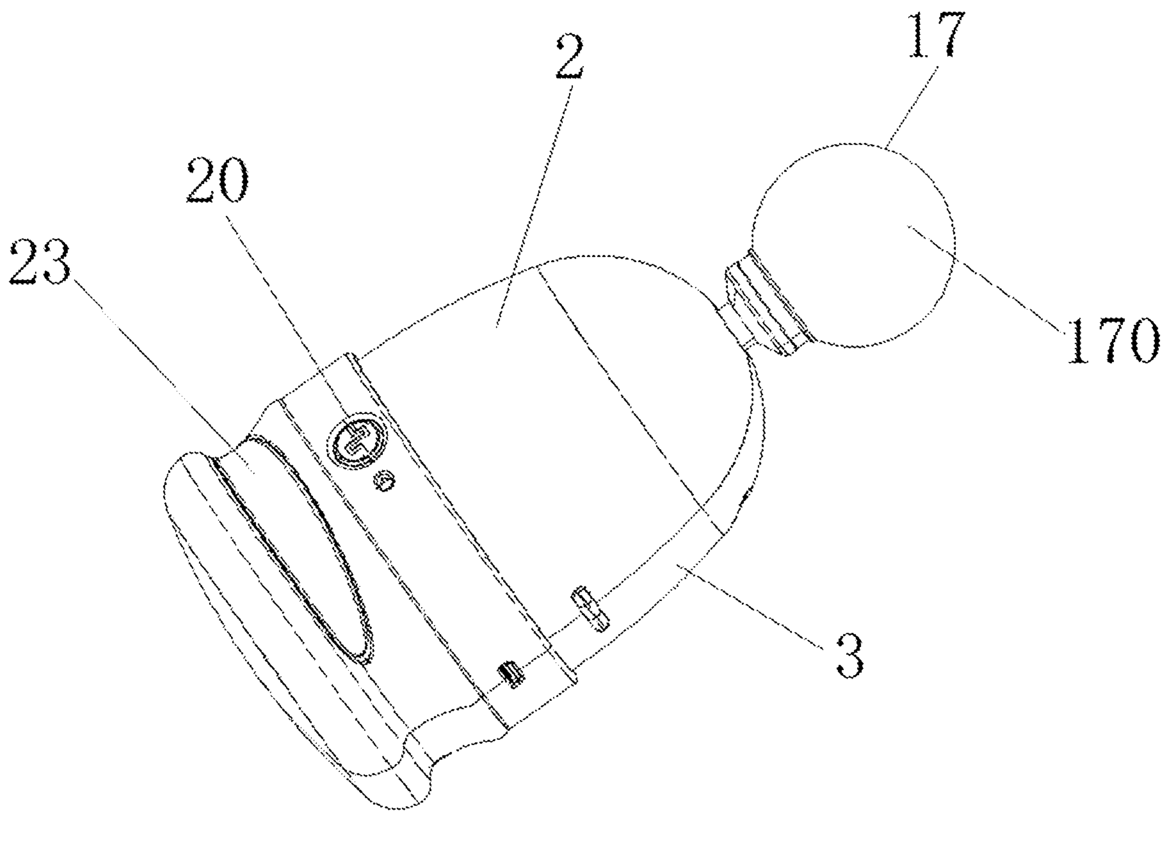
FIG. 1 is a schematic structural diagram of a hand-held low-noise shock-absorbing electric massager in the present disclosure.

Reference numerals: 1—a moving shaft rod, 10—a shaft sleeve lubricating member, 101—an annular groove, 11—a second shock—absorbing member, 12—a transmission module bracket, 121—a socket, 122—a first shock—absorbing member, 13—a shaft sleeve fixing cover, 14—a motor, 15—an eccentric piece, 16—a swing rod, 17—a massage head, 170—a shock—absorbing pad, 171—a nano coating, 172—a sound—insulation layer, 173—a sound—absorbing cloth cover, 174—a filling cavity, 175—a sound—insulation medium, 18—a lithium battery, 19—a circuit board, and 191—a switch.

2—a lower shell, 20—a button, 21—a skeleton, 22—a sound reflection plate, and 23—an anti—skid shock—absorbing rubber strip.

3—an upper shell.

DETAILED DESCRIPTION OF THE EMBODIMENTS

The technical solutions in the embodiments of the present disclosure will be described below clearly and completely with reference to the accompanying drawings in the embodiments of the present disclosure. Apparently, the described embodiments are merely some rather than all of the embodiments of the present disclosure. All other embodiments obtained by those of ordinary skill in the art based on the embodiments of the present disclosure without creative efforts shall fall within the protection scope of the present disclosure.

Embodiment 1

Figure 2:
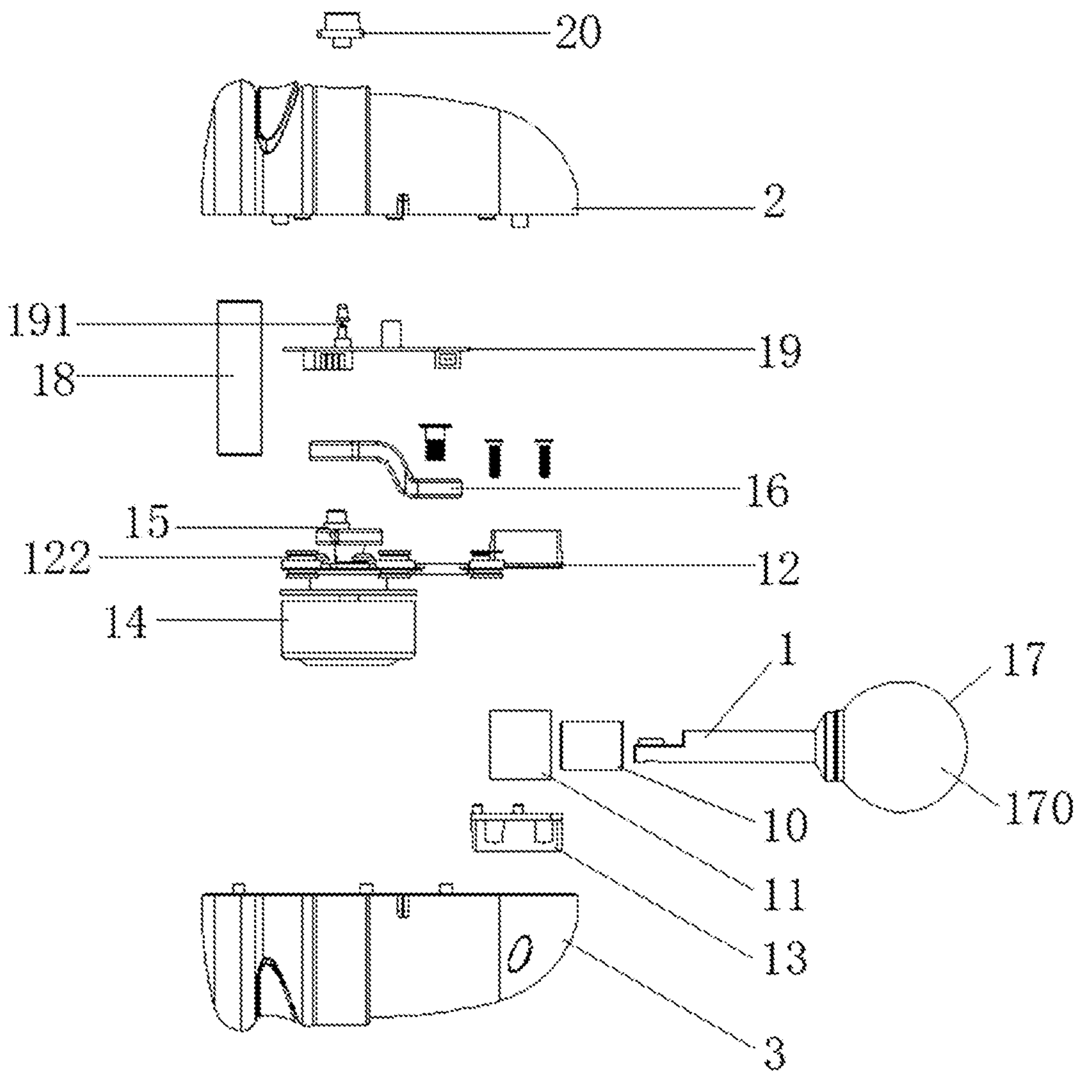
FIG. 2 is an exploded diagram of components of the hand-held low-noise shock-absorbing electric massager in the present disclosure.
Figure 3:
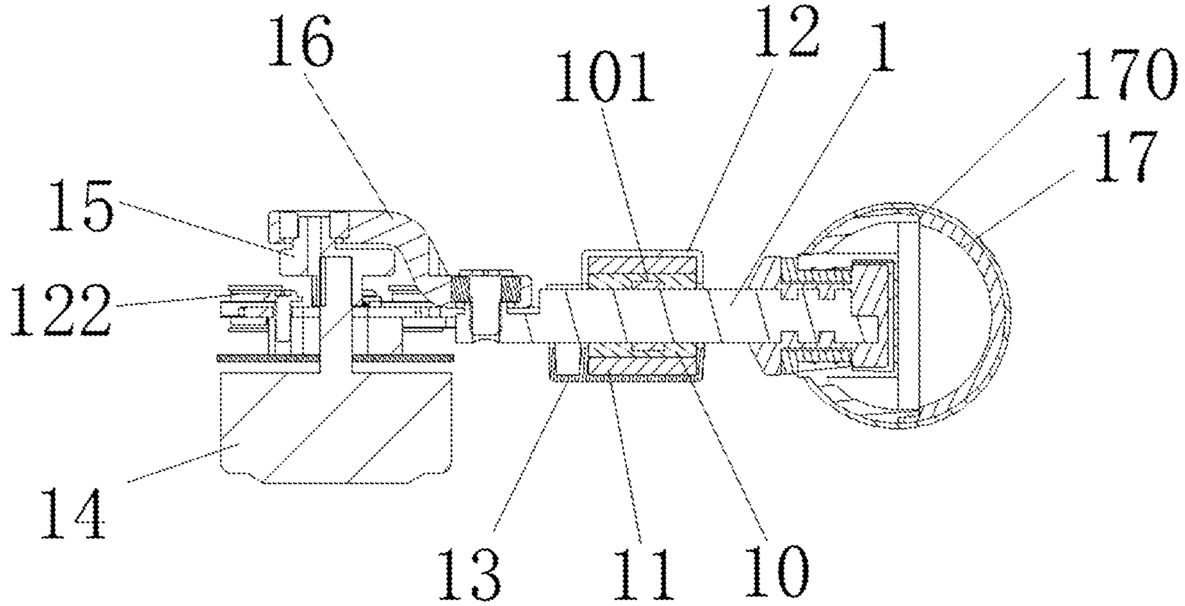
FIG. 3 is a sectional view of a moving shaft rod in the present disclosure.
Figure 4:
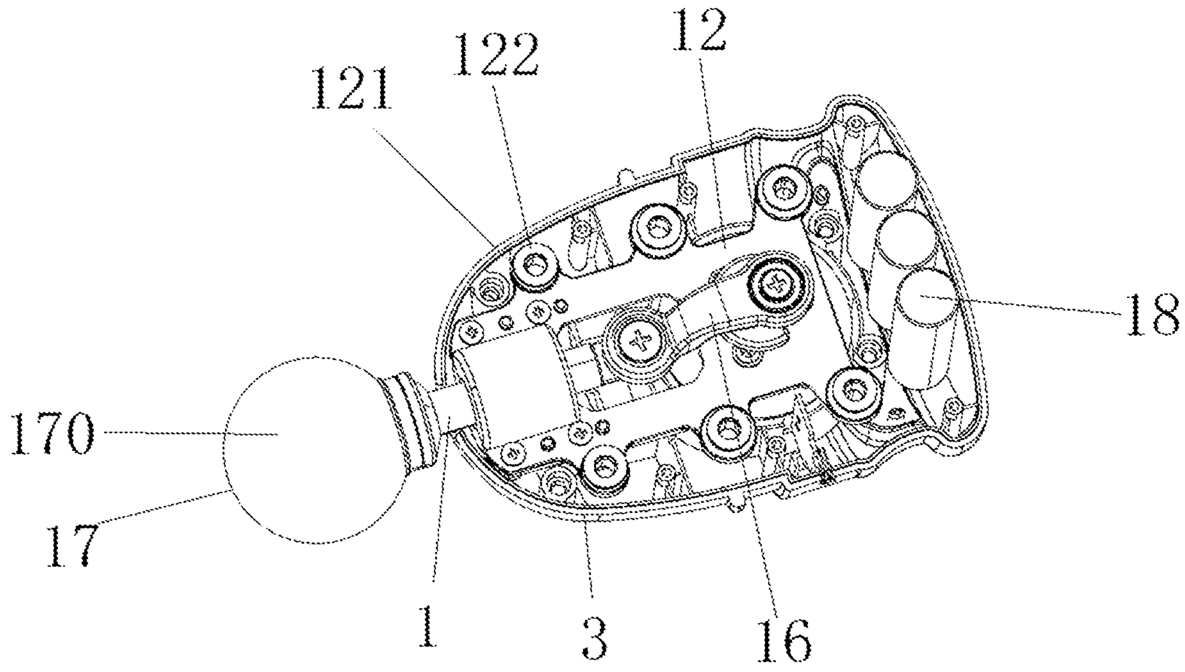
FIG. 4 is an installation diagram of a transmission module bracket in the present disclosure.
Figure 5:
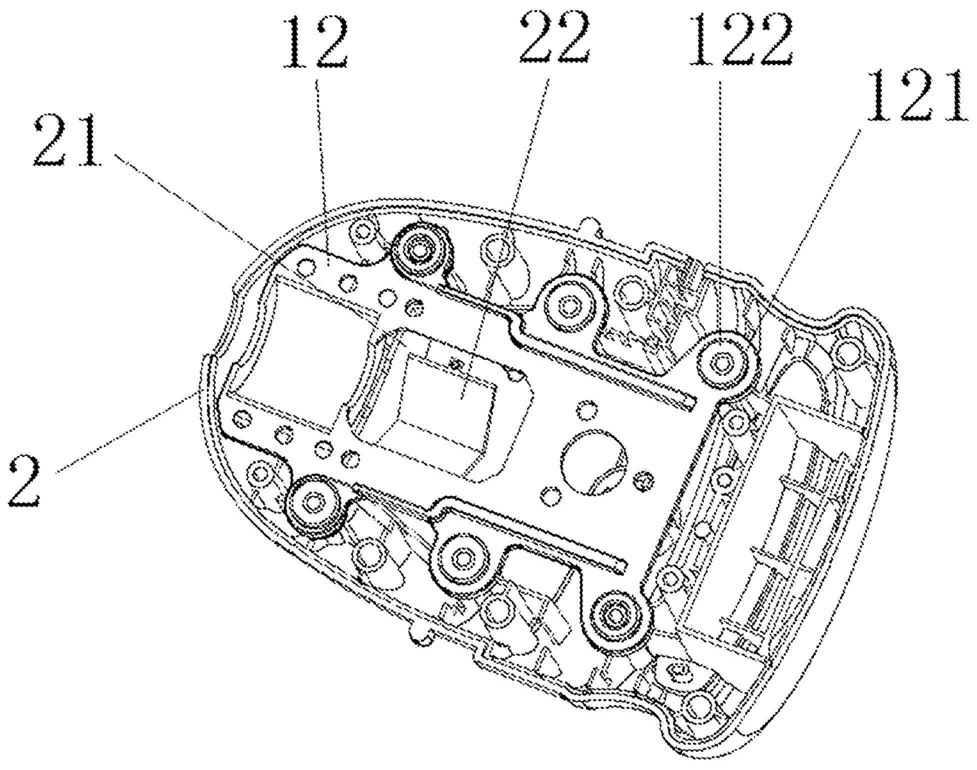
FIG. 5 is an installation diagram of a sound reflection plate in the present disclosure.
Figure 6:
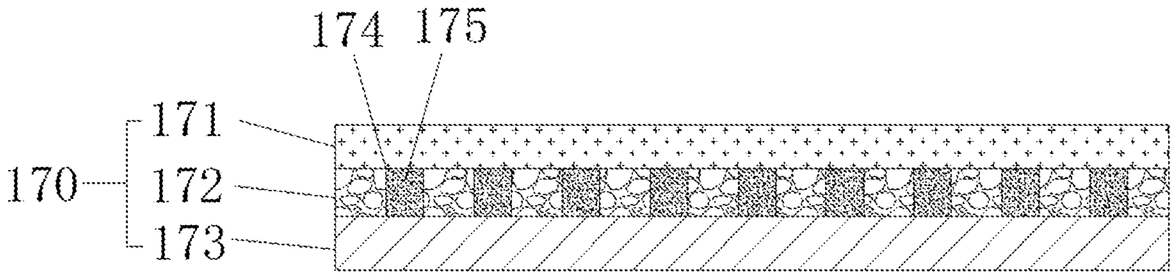
FIG. 6 is a distribution diagram of material layers of a shock-absorbing pad in the present disclosure.

Referring to FIG. 1 to FIG. 5, in the embodiment of the present disclosure, a hand-held low-noise shock-absorbing electric massager includes shells and a moving shaft rod 1. A right end of the moving shaft rod 1 is provided with a massage head 17 and a left end is provided with a driving part controlling the moving shaft rod 1 to perform linear reciprocating motion. The hand-held low-noise shock-absorbing electric massager further includes a transmission module bracket 12. An outer side wall of the moving shaft rod 1 is coaxially provided with a shaft sleeve lubricating member 10. An inner side wall of the shaft sleeve lubricating member 10 is in close linear high-speed sliding fit with the outer side wall of the moving shaft rod 1. The shaft sleeve lubricating member 10 plays a guiding role, reduces the resistance during motion of the moving shaft rod 1, and reduces vibration generated between the moving shaft rod 1 and the transmission module bracket 12 during motion, such that noise is also reduced. A right end of the transmission module bracket 12 is provided with a shaft sleeve fixing cover 13. The shaft sleeve fixing cover 13 and the right end of the transmission module bracket 12 form a cavity for installation of the shaft sleeve lubricating member 10. The shaft sleeve fixing cover 13 is fixed with the transmission module bracket 12 by screws. The driving part is arranged at a left end of the transmission module bracket 12. Two sides of the transmission module bracket 12 are each provided with a first shock-absorbing member 122. An axis of the first shock-absorbing member 122 and an axis of the moving shaft rod 1 are perpendicular to each other. One end of the first shock-absorbing member 122 abuts against an inner side wall of the lower shell 2, and the other end abuts against an inner side wall of the upper shell 3. The first shock-absorbing member 122 acts on the inner side walls of the lower shell 2 and the upper shell 3 at the same time, so as to prevent the shells from generating abnormal noise and unnecessary vibrations from vibration of the moving shaft rod 1, which can improve the comfort when the user holds the massager. A sound reflection plate 22 is arranged on the inner side walls of the lower shell 2 and the upper shell 3, respectively, which reflects a sound wave in an area that generates more sound during operation to the sound-absorbing cloth cover 173 of the transmission module bracket 12, so as to prevent the sound wave from being transmitted to the outside of the inner cavity of the shell. A shock-absorbing pad 170 covers an outer surface of the massage head 17. In use, the shock-absorbing pad 170 is in direct contact with the massage area of the user, and the shock-absorbing pad 170 effectively reduces the vibration and noise generated by the electronic components in the massage head 17 during operation when the massage head 17 is in contact with the user, and improves the use comfort when in contact with the massage head 17. The shock-absorbing pad 170 is connected with the surface of the massage head 17 by pasting.

Preferably, an outer side wall of the shaft sleeve lubricating member 10 is coaxially provided with a second shock-absorbing member 11, the inner side wall of the shaft sleeve lubricating member 10 is provided with an annular groove 101, and the annular groove 101 is provided with a filler. The second shock-absorbing member 11 can effectively reduce vibration when the shaft sleeve lubricating member 10 is in contact with the transmission module bracket 12 by wrapping.

Preferably, the second shock-absorbing member 11 is a silica gel ring, the shaft sleeve lubricating member 10 is a special wear-resistant alloy copper sleeve, and the filler in the annular groove 101 may be lubricating grease. The lubricating grease is one from the group consisting of lithium-based grease, calcium-based grease, aluminum-based grease, complex lithium-based grease, and complex aluminum-based grease. Friction between the body of the moving shaft rod 1 and the inner side wall of the shaft sleeve lubricating member 10 is further reduced by the lubricating grease.

Preferably, the first shock-absorbing member 122 is a silica gel column. At least three silica gel columns are arranged on one side of the transmission module bracket 12. A socket 121 for installation of each of the silica gel columns is formed in the transmission module bracket 12. Each of the silica gel columns penetrates the socket 121, and a top end of each of the silica gel columns abuts against the inner side wall of the lower shell 2 and a bottom end of each of the silica gel columns abuts against the inner side wall of the upper shell 3. The silica gel columns are installed through the through holes for easy installation by technicians.

Preferably, the transmission module bracket 12 is made of an aluminum material, so as to prevent the transmission module bracket 12 from deforming.

Preferably, the shock-absorbing pad 170 includes a sound-absorbing cloth cover 173, a sound-insulation layer 172, and a nano coating 171 arranged from bottom to top. Two sides of the sound-insulation layer 172 are respectively connected with the sound-absorbing cloth cover 173 and the nanocoating 171 by pasting. The sound-insulation layer 172 is further provided with a plurality of filling cavities 174. A sound-insulation medium 175 is arranged in each of the filling cavities 174.

Preferably, the sound-absorbing cloth cover 173 has a thickness of 0.02 cm. The sound-insulation layer 172 has a thickness of 0.2 cm. The sound-insulation medium 175 is aluminum powder, which has excellent sound insulation performance. The nano coating 171 is a nano magnetic coating made of nano nickel powder, which improves the comfort when in contact with the epidermis of the user, and has physical magnetism. A generated magnetic field has an effect on the nervous system, heart function, blood components, endocrine function and activity of the human body. The nano magnetic coating has a thickness of 0.1 cm.

Preferably, the driving part includes a lithium battery 18 arranged on the inner side wall of the upper shell 3, a circuit board 19 arranged on the inner side wall of the lower shell 2, a motor 14 arranged on the transmission module bracket 12, and a swing rod 16 for transmission. A rotating shaft of the motor 14 is in transmission connection with an eccentric piece 15. One end of the swing rod 16 is connected with the eccentric piece 15 and the other end is connected with the left end of the moving shaft rod 1. A switch 191 is arranged on the circuit board 19. A button 20 matched with the switch 191 is arranged on the lower shell 2. The motor 14 is electrically connected with the lithium battery 18 through the circuit board 19.

Preferably, a skeleton 21 for installation of the right end of the transmission module bracket 12 is arranged on the inner side walls of the upper shell 3 and the lower shell 2. The sound reflection plate 22 is arranged on two sides of the skeleton 21, respectively. The sound reflection plate 22 has a V-shaped cross section with an included angle of 110°-115°, which increases the reflection area of the sound wave. The included angel faces a surface of the transmission module bracket 12. The sound-absorbing cloth cover 173 covers the surface of the transmission module bracket 12, so as to absorb the reflected sound wave, which has the effect of silencing. Two sides of the sound reflection plate 22 are fixed with the lower shell 2 and the upper shell 3 by screws. Edges of the lower shell 2 and the upper shell 3 are fixed by screws after being buckled. Bottoms of outer side surfaces of the lower shell 2 and the upper shell 3 are both provided with an anti-skid shock-absorbing rubber strip 23, which is convenient for users to hold and use.

Embodiment 2

The difference between the present embodiment and Embodiment 1 is that in the present embodiment, the sound-absorbing cloth cover 173 has a thickness of 0.1 cm. The sound-insulation layer 172 has a thickness of 0.3 cm. The sound-insulation medium 175 is aluminum powder. The nano coating 171 is a nano magnetic coating made of nano nickel powder. The nano magnetic coating has a thickness of 0.2 cm.

The rest of the content of the present embodiment is the same as that of Embodiment 1, and will not be repeated here.

Embodiment 3

The difference between the present embodiment and Embodiment 1 is that in the present embodiment, the sound-absorbing cloth cover 173 has a thickness of 0.06 cm. The sound-insulation layer 172 has a thickness of 0.25 cm. The sound-insulation medium 175 is aluminum powder, which has excellent sound insulation performance. The nano coating 171 is a nano magnetic coating made of nano nickel powder, which improves the comfort when in contact with the epidermis of the user, and has physical magnetism. A generated magnetic field has an effect on the nervous system, heart function, blood components, endocrine function and activity of the human body. The nano magnetic coating has a thickness of 0.15 cm.

The rest of the content of the present embodiment is the same as that of Embodiment 1, and will not be repeated here.

For those skilled in the art, it is apparent that the present disclosure is not limited to the details of the foregoing exemplary embodiments, and that the present disclosure can be implemented in other specific forms without departing from the spirit or basic features of the present disclosure. The embodiments should be regarded as exemplary and non-limiting in every respect, and the scope of the present disclosure is defined by the appended claims rather than the above description. Therefore, all changes falling within the meaning and scope of equivalent elements of the claims should be included in the present disclosure. Any reference numeral in the claims should not be considered as limiting the involved claims.

What is claimed is:

1. A hand-held low-noise shock-absorbing electric massager, comprising a lower shell, an upper shell, and a moving shaft rod, wherein a right end of the moving shaft rod is provided with a massage head, and a left end of the moving shaft rod is provided with a driving part controlling the moving shaft rod to perform a linear reciprocating motion, the hand-held low-noise shock-absorbing electric massager further comprises a transmission module bracket, an outer side wall of the moving shaft rod is coaxially provided with a shaft sleeve lubricating member, an inner side wall of the shaft sleeve lubricating member is in a sliding fit with the outer side wall of the moving shaft rod, a right end of the transmission module bracket is provided with a shaft sleeve fixing cover, the shaft sleeve fixing cover and the right end of the transmission module bracket form a cavity for an installation of the shaft sleeve lubricating member, the driving part is arranged at a left end of the transmission module bracket, two sides of the transmission module bracket are each provided with at least three a first shock-absorbing members, an axis of each of the first shock-absorbing member and an axis of the moving shaft rod are perpendicular to each other, a first end of each of the first shock-absorbing member abuts against an inner side wall of the lower shell, and a second end of each of the first shock-absorbing member abuts against an inner side wall of the upper shell, a sound reflection plate is arranged on the inner side wall of the lower shell and the inner side wall of the upper shell, respectively, and a shock-absorbing pad covers an outer surface of the massage head; wherein the shock-absorbing pad comprises a sound-absorbing cloth cover, a sound-insulation layer, and a nano coating arranged from a bottom to a top, two sides of the sound-insulation layer are respectively connected with the sound-absorbing cloth cover and the nanocoating by pasting, the sound-insulation layer is further provided with a plurality of filling cavities, and a sound-insulation medium is arranged in each of the plurality of filling cavities.

2. The hand-held low-noise shock-absorbing electric massager according to claim 1, wherein an outer side wall of the shaft sleeve lubricating member is coaxially provided with a second shock-absorbing member, and the inner side wall of the shaft sleeve lubricating member is provided with an annular groove, and the annular groove is provided with a filler.

3. The hand-held low-noise shock-absorbing electric massager according to claim 2, wherein the second shock-absorbing member is a silica gel ring, the shaft sleeve lubricating member is a wear-resistant alloy copper sleeve, and the filler in the annular groove is a lubricating grease, wherein the lubricating grease is one from the group consisting of a lithium-based grease, a calcium-based grease, an aluminum-based grease, a complex lithium-based grease, and a complex aluminum-based grease.

4. The hand-held low-noise shock-absorbing electric massager according to claim 1, wherein each of the first shock-absorbing member is a silica gel column, and at least three silica gel columns are arranged on the two sides of the transmission module bracket, a socket for an installation of each of the at least three silica gel columns is formed in the transmission module bracket, each of the at least three silica gel columns penetrates the socket, and a top end of each of the at least three silica gel columns abuts against the inner side wall of the lower shell and a bottom end of each of the at least three silica gel columns abuts against the inner side wall of the upper shell.

5. The hand-held low-noise shock-absorbing electric massager according to claim 1, wherein the transmission module bracket is made of an aluminum material.

6. The hand-held low-noise shock-absorbing electric massager according to claim 1, wherein the sound-absorbing cloth cover has a thickness of 0.02-0.1 cm, the sound-insulation layer has a thickness of 0.2-0.3 cm, the sound-insulation medium is an aluminum powder, the nano coating is a nano magnetic coating made of a nano nickel powder, and the nano magnetic coating has a thickness of 0.1-0.2 cm.

7. The hand-held low-noise shock-absorbing electric massager according to claim 1, wherein the driving part comprises a lithium battery arranged on the inner side wall of the upper shell, a circuit board arranged on the inner side wall of the lower shell, a motor arranged on the transmission module bracket, and a swing rod for a transmission, a rotating shaft of the motor is in a transmission connection with an eccentric piece, a first end of the swing rod is connected with the eccentric piece and a second end of the swing rod is connected with the left end of the moving shaft rod, a switch is arranged on the circuit board, a button matched with the switch is arranged on the lower shell, and the motor is electrically connected with the lithium battery through the circuit board.

8. The hand-held low-noise shock-absorbing electric massager according to claim 1, wherein a skeleton for an installation of the right end of the transmission module bracket is arranged on the inner side wall of the upper shell and the inner side wall of the lower shell, the sound reflection plate is arranged on two sides of the skeleton, respectively, the sound reflection plate has a V-shaped cross section with an included angle of 110°-115°, the included angle faces a surface of the transmission module bracket, a sound-absorbing cloth cover covers the surface of the transmission module bracket, two sides of the sound reflection plate are fixed with the lower shell and the upper shell by first screws, an edge of the lower shell and an edge of the upper shell are fixed by second screws after being buckled, and a bottom of an outer side surface of the lower shell and a bottom of outer side surface of the upper shell are both provided with an anti-skid shock-absorbing rubber strip.

* * * * *